3,205,242
19-ALKYL-Δ⁵-ANDROSTENE-3β,19-DIOL-17-ONES
Albert Bowers, Mexico City, Mexico, assignor to Syntex
  Corporation, Panama, Panama, a corporation of
  Panama
No Drawing. Filed June 12, 1962, Ser. No. 201,764
  Claims priority, application Mexico, Dec. 4, 1961,
          65,270
       3 Claims. (Cl. 260—397.4)

The present invention relates to novel cyclopentanophenanthrene derivatives and to a process for the production thereof.

More particularly, the present invention relates to novel 19-hydroxy-Δ⁵-androsten-3β-ol compounds and to 19-lower alkyl derivatives thereof.

The novel compounds of the present invention are represented by the following formulas:

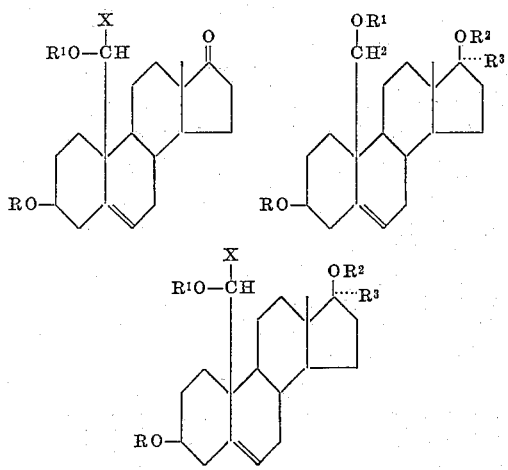

In the above formulas R, R¹, and R² each represents hydrogen or a hydrocarbon carboxylic acyl group of less than 12 carbon atoms; R³ represents hydrogen lower alkyl, lower alkenyl or lower alkinyl; and X represents a lower alkyl group.

The acyl group is derived from hydrocarbon carboxylic acids containing less than 12 carbon atoms which may be saturated or unsaturated of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas exhibit anabolic and androgenic activities, and inhibit the production of pituitary gonadrotropic hormones and ACTH. In addition, they have anti-estrogenic properties and lower the blood, liver and adrenal cholesterol levels. Furthermore, they are useful in the control of fertility and psychotic conditions, and are appetite stimulants.

The novel 19-lower alkyl-19-hydroxy compounds of the present invention are prepared by the process illustrated by the following equation:

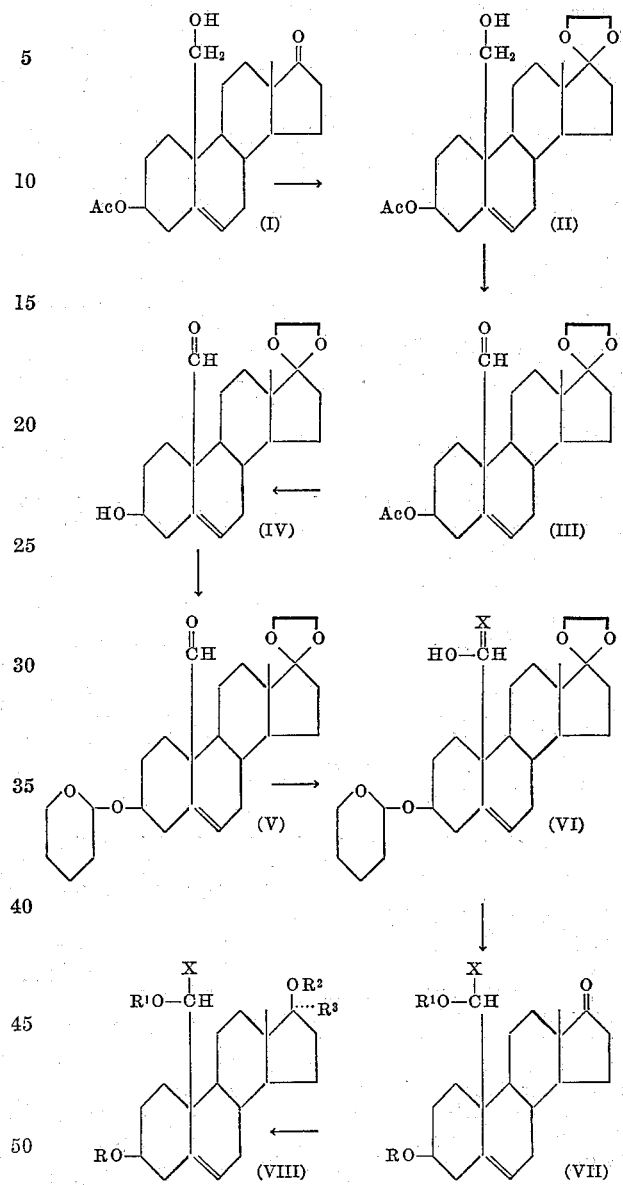

In the above formulas R, R¹, R², R³ and X have the same meaning as previously set forth. Ac represents the acyl group of a hydrocarbon carboxylic acid of less than 12 carbon atoms, preferably the acetyl group.

In carrying out the process outlined above, the starting Δ⁵-androstene-3β,19-diol-17-one 3-acetate (I) is treated conventionally with ethylene glycol in the presence of p-toluenesulfonic acid to produce the 17-cycloethylenedioxy derivative thereof (II), which upon oxidation in a neutral or slightly basic medium, e.g. with chromium trioxide in pyridine, yields 17-cycloethylenedioxy-Δ⁵-androsten-3β-ol-19-al acetate (III). Conventional saponification of the latter in a basic medium affords the corresponding 3-free alcohol (IV), which is treated with dihydropyrane in the presence of p-toluenesulfonic acid under anhydrous conditions, to give the 3-tetrahydropyranylether of 17 - cycloethylenedioxy-Δ⁵-androsten-3β-ol-19-al (V). This last named compound is treated with a lower alkyl magnesium bromide to produce the 3-tetrahydropyranylether of the corresponding 17-cycloethylenedioxy-19-lower alkyl-Δ⁵-androstene-3β,19-diol (VI), which upon treatment in an acid medium yields the corresponding 19-lower alkyl-Δ⁵-androstene-3β,19-diol-17-one (VII). Reduction of the carbonyl group of the last named compound, e.g. with sodium borohydride affords the corresponding 17β-alcohol (VIII: R²=R³=H). Treatment of the 19-lower alkyl-Δ⁵-androstene-3β,19-diol-17 - one derivatives (VII) with a lower alkyl, lower alkenyl or lower alkinyl magnesium halide, such as methyl magnesium bromide, vinyl magnesium bromide or ethinyl magnesium bromide, yields the corresponding 17α-(lower alkyl, lower alkenyl or lower alkinyl)-19-lower alkyl-Δ⁵-androstene-3β,17β,19-triol compounds (VIII: R³≠H).

The secondary alcohols of the compounds of the type described herein before, for example, the 3β-hydroxyl, the 19-hydroxyl or the 17β-hydroxyl of the 17α-unsubstituted compounds, are conventionally acylated in pyridine with an acylating agent such as an anhydride derived from hydrocarbon carboxylic acids of the previously defined type, to give the corresponding acylates.

The tertiary hydroxyl group of said compounds, namely, the 17β-hydroxyl of the 17α-substituted compounds, is esterified conventionally in the presence of p-toluenesulfonic acid with an acylating agent, such as acetic anhydride or caproic anhydride, thus affording the corresponding esters.

The 19-primary alcohol derivatives of the present invention are prepared by the process exemplified by the following scheme:

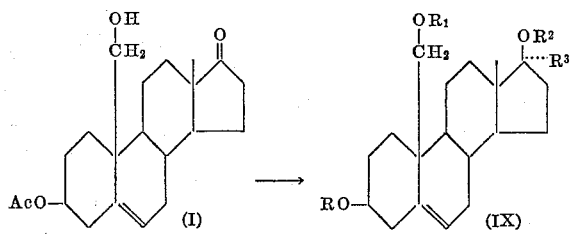

In the above formulas R, R¹, R², and R³ have the same meaning as defined hereinbefore.

In the practicing the process just outlined, the starting Δ⁵-androstene-3β,19-diol-17-one 3-acetate (I) is reduced, preferably with sodium borohydride to give the corresponding 17β-alcohol (IX: R¹=R²; R³=H). Upon treatment of the starting compound (I) with a lower alkyl, a lower alkenyl or lower alkinyl magnesium halide, such as methyl, vinyl, or ethinyl magnesium bromide, there are obtained the corresponding 17α-(lower alkyl, lower alkenyl or lower alkinyl) - Δ⁵-androstene-3β,17β,19-triol compounds (IX: R³=hydrocarbon; R=R¹=R²=H). During the latter reaction, the 3-acetoxy group present in the starting material is concomitantly saponified.

The primary and secondary hydroxyl groups of the compounds of the type described hereinbefore are conventionally acylated in pyridine with an acylating agent such as an anhydride of the previously defined type, thus affording the corresponding acylates. The tertiary hydroxyl groups of said compounds are esterified conventionally in the presence of p-toluenesulfonic acid with an acylating agent, such as an anhydride derived from hydrocarbon carboxylic acids of less than 12 carbon atoms, to give the corresponding esters.

The following specific examples serve to illustrate but are not intended to limit the scope of the present invention:

*Example I*

A mixture of 1 g. of the 3-acetate of Δ⁵-androstene-3β, 19-diol-17-one (obtained in accordance with my copending U.S. patent application Serial No. 194,716, filed May 14, 1962, now U.S. Patent No. 3,065,228), 25 cc. of dry benzene, 5 cc. of ethylene glycol and 50 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded 17-cycloethylenedioxy-Δ⁵-androstene-3β, 19-diol 3-acetate.

*Example II*

A solution of 6 g. of the latter compound in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 17-cycloethylenedioxy-Δ⁵-androsten-3β-ol-19-al acetate.

*Example III*

2 g. of the latter acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 17-cycloethylenedioxy-Δ⁵-androsten-3β-ol-19-al.

*Example IV*

2 cc. of dihydropyrane were added to a solution of 1 g. of the foregoing 3β-alcohol in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 17-cycloethylenedioxy-Δ⁵-androstene-3β-ol-19-al.

*Example V*

A solution of 5 g. of the latter steroid in 250 cc. of thiophene-free benzene was treated with 27.5 cc. of 4 N methyl magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded the 3-tetrahydropyranylether of 17-cycloethylenedioxy-19-methyl-Δ⁵-androstene-3β,19-diol.

*Example VI*

Following the procedure of the foregoing example, except that methyl magnesium bromide was substituted by ethyl magnesium bromide, there was obtained the 3-tetrahydropyranylether of 17-cycloethylenedioxy-19-ethyl-Δ⁵-androstene-3β,19-diol.

*Example VII*

A solution of 500 mg. of the 3-tetrahydropyranylether of 17-cycloethylenedioxy-19-methyl-Δ⁵-androstene-3β,19-diol, in 25 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-methyl-Δ⁵-androstene-3β,19-diol-17-one.

The 3-tetrahydropyranylether of 17-cycloethylenedioxy-19-ethyl-Δ⁵-androstene-3β,19-diol was treated by the same technique, thus affording 19-ethyl-Δ⁵-androstene-3β,19-diol-17-one.

*Example VIII*

A mixture of 1 g. of 19-methyl-Δ⁵-androstene-3β,19-diol-17-one, 4 cc. of pyridine and 2 cc. of acetic anhydride was kept at room temperature overnight, poured into ice water, the formed precipitate was filtered, washed with water and dried. Crystallization from acetone-hexane gave 19-methyl-Δ⁵-androstene-3β,19-diol-17-one diacetate. 19-ethyl-Δ⁵-androstene-3β,19-diol-17-one was treated by the same procedure to give 19-ethyl-Δ⁵-androstene-3β,19-diol-17-one diacetate.

*Example IX*

A solution of 2 g. of sodium borohydride in 30 cc. of methanol was added with stirring to a solution of 2 g. of 19-methyl-Δ⁵-androstene-3β,19-diol-17-one diacetate in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 19-methyl-Δ⁵-androstene-3β,17β,19-triol 3,19-diacetate.

19-ethyl-Δ⁵-androstene-3β,19-diol-17-one diacetate was treated by the above procedure, to produce, 19-ethyl-Δ⁵-androstene-3β,17β,19-triol 3,19-diacetate.

*Example X*

19-methyl-Δ⁵-androstene-3β,19-diol-17-one and 19-ethyl-Δ⁵-androstene-3β,19-diol-17-one were treated following the procedure of the foregoing example, giving respectively: 19-methyl-Δ⁵-androstene-3β,17β,19-triol and 19-ethyl-Δ⁵-androstene-3β,17β,19-triol.

*Example XI*

A solution of 5 g. of 19-methyl-Δ⁵-androstene-3β,19-diol-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α,19-dimethyl-Δ⁵-androstene-3β,17β,19-triol.

19-ethyl-Δ⁵-androstene-3β,19-diol-17-one was treated in accordance with the above procedure, thus affording 17α-methyl-19-ethyl-Δ⁵-androstene-3β,17β,19-triol.

*Example XII*

19-methyl-Δ⁵-androstene-3β,19-diol-17-one and 19-ethyl-Δ⁵-androstene-3β,19-diol-17-one were treated in accordance with Example XI, except that methyl magnesium bromide was substituted by vinyl magnesium bromide, thus affording respectively: 17α-vinyl-19-methyl-Δ⁵-androstene-3β,17β,19-triol and 17α-vinyl-19-ethyl-Δ⁵-androstene-3β,17β,19-triol.

*Example XIII*

19-methyl-Δ⁵-androstene-3β,19-diol-17-one and 19-ethyl-Δ⁵-androstene-3β,19-diol-17-one were treated following the procedure described in Example XI, with the exception that ethinyl magnesium bromide was used instead of methyl magnesium bromide, thus giving respectively: 17α-ethinyl-19-methyl-Δ⁵-androstene-3β,17β,19-triol and 17α-ethinyl-19-ethyl-Δ⁵-androstene-3β,17β,19-triol.

*Example XIV*

The 3-tetrahydropyranylether of 17-cycloethylenedioxy-19-methyl-Δ⁵-androstene-3β,19-diol was treated in accordance with Example VIII to produce the 3-tetrahydropyranylether-19-acetate of 17-cycloethylenedioxy-19-methyl-Δ⁵-androstene-3β,19-diol, which upon treatment in accordance with Example VII yielded the 19-acetate of 19-methyl-Δ⁵-androstene-3β,19-diol-17-one. Reduction of the latter by the procedure of Example IX, yielded the 19-acetate of 19-methyl-Δ⁵-androstene-3β,17β,19-triol.

*Example XV*

The starting compounds listed under A were treated by the procedure described in Example VIII, to produce the corresponding products set forth under B.

| A | B |
|---|---|
| 17α,19-dimethyl-Δ⁵-androstene-3β,17β,19-triol. | 17α,19-dimethyl-Δ⁵-androstene-3β,17β,19-triol 3,19-diacetate. |
| 17α-methyl-19-ethyl-Δ⁵-androstene-3β,17β,19-triol. | 17α-methyl-19-ethyl-Δ⁵-androstene-3β,17β,19-triol 3,19-diacetate. |
| 17α-vinyl-19-methyl-Δ⁵-androstene-3β,17β,19-triol. | 17α-vinyl-19-methyl-Δ⁵-androstene-3β,17β,19-triol 3,19-diacetate. |
| 17α-vinyl-19-ethyl-Δ⁵-androstene-3β,17β,19-triol. | 17α-vinyl-19-ethyl-Δ⁵-androstene-3β,17β,19-triol 3,19-diacetate. |
| 17α-ethinyl-19-methyl-Δ⁵-androstene-3β,17β,19-triol. | 17α-ethinyl-19-methyl-Δ⁵-androstene-3β,17β,19-triol 3,19-diacetate. |
| 17α-ethinyl-19-ethyl-Δ⁵-androstene-3β,17β,19-triol. | 17α-ethinyl-19-ethyl-Δ⁵-androstene-3β,17β,19-triol 3,19-diacetate. |

*Example XVI*

To a solution of 5 g. of 17α,19-dimethyl-Δ⁵-androstene-3β,17β,19-triol in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydrides. The benzene layer was separated and washed with 10% sodium carbonate solution and water. Drying, evaporation and crystallization of the residue from ether-hexane produced 17α,19-dimethyl-Δ⁵-androstene-3β,17β,19-triol tricaproate.

The starting compounds listed under A were treated by the above procedure, thus affording the corresponding products set forth under B.

| A | B |
|---|---|
| 17α-methyl-19-ethyl-Δ⁵-androstene-3β,17β,19-triol. | 17α-methyl-19-ethyl-Δ⁵-androstene-3β,17β,19-triol tricaproate. |
| 17α-vinyl-19-methyl-Δ⁵-androstene-3β,17β,19-triol | 17α-vinyl-19-methyl-Δ⁵-androstene-3β,17β,19-triol tricaproate. |
| 17α-vinyl-19-ethyl-Δ⁵-androstene-3β,17β,19-triol. | 17α-vinyl-19-ethyl-Δ⁵-androstene-3β,17β,19-triol tricaproate. |
| 17α-ethinyl-19-methyl-Δ⁵-androstene-3β,17β,19-triol | 17α-ethinyl-19-methyl-Δ⁵-androstene-3β,17β,19-triol tricaproate. |
| 17α-ethinyl-19-ethyl-Δ⁵-androstene-3β,17β,19-triol. | 17α-ethinyl-19-ethyl-Δ⁵-androstene-3β,17β,19-triol tricaproate. |

*Example XVII*

The starting compounds of the preceding example were treated in accordance with that example, except that caproic anhydride was substituted by propionic anhydride, undecenoic anhydride and enanthic anhydride, to produce respectively the corresponding tri-propionates, tri-undecenoates and tri-enanthates.

*Example XVIII*

17α,19-dimethyl-Δ⁵-androstene-3β,17β,19-triol tri-caproate was treated in accordance with Example III, to give 17α,19-dimethyl-Δ⁵-androstene-3β,17β,19-triol 17-caproate.

*Example XIX*

19-methyl-Δ⁵-androstene-3β,17β,19-triol and 19-ethyl-Δ⁵-androstene-3β,17β,19-triol were treated in accordance with Example VIII, affording respectively: 19-methyl-Δ⁵-androstene-3β,17β,19-triol tri-acetate and 19-ethyl-Δ⁵-androstene-3β,17β,19-triol tri-acetate.

Example XX

The 3-acetate of Δ⁵-androstene-3β,19-diol-17-one was treated in accordance with Example IX, thus giving the 3-acetate of Δ⁵-androstene-3β,17β,19-triol, which upon treatment with acetic anhydride in accordance with Example VIII, gave the tri-acetate of Δ⁵-androstene-3β,17β,19-triol.

Example XXI

The 3-acetate of Δ⁵-androstene-3β,19-diol-17-one was treated in accordance with Examples XI, XII and XIII, furnishing respectively: 17α - methyl - Δ⁵ - androstene-3β,17β,19-triol, 17α - vinyl-Δ⁵-androstene-3β,17β,19-triol and 17α-ethinyl-Δ⁵-androstene- 3β,17β,19-triol.

Example XXII

The final compounds of Example XXI, were treated in accordance with Example VIII, yielding respectively: 17α-methyl-Δ⁵-androstene-3β,17β,19-triol 3,19 - diacetate, 17α-vinyl-Δ⁵-androstene-3β,17β,19-triol 3,19-diacetate and 17α-ethinyl-Δ⁵-androstene-3β,17β,19-triol 3,19-diacetate.

Example XXIII

The final compounds of Example XXII were treated in accordance with Example XVI, furnishing respectively: 17α-methyl-Δ⁵-androstene-3β,17β,19-triol 3,19-diacetate-17-caproate, 17α-vinyl-Δ⁵-androstene-3β,17β,19-triol 3,19-diacetate - 17 - caproate and 17α - ethinyl-Δ⁵-androstene-3β,17β,19-triol 3,19-diacetate-17-caproate.

I claim:
1. A compound of the following formula:

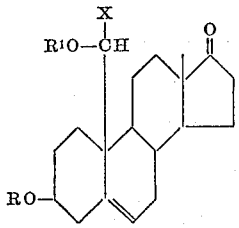

wherein R and $R_1$ are selected from the group consisting of hydrogen and a hydrocarbon carboxylic acyl group of less than 12 carbon atoms and X is a lower alkyl group.
2. 19-methyl-Δ⁵-androstene-3β,19-diol-17-one.
3. 19-ethyl-Δ⁵-androstene-3β,19-diol-17-one.

References Cited by the Examiner
UNITED STATES PATENTS
3,067,198 12/62 Wettstein et al. _____ 260—239.55

LEWIS GOTTS, *Primary Examiner.*